US008615336B1

(12) United States Patent
Vos

(10) Patent No.: US 8,615,336 B1
(45) Date of Patent: Dec. 24, 2013

(54) SYSTEM AND METHOD FOR CONTROLLING POWER IN A HYBRID VEHICLE USING COST ANALYSIS

(75) Inventor: David W. Vos, Delaplane, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/485,184

(22) Filed: May 31, 2012

(51) Int. Cl.
*B60K 1/00* (2006.01)

(52) U.S. Cl.
USPC .............................. 701/3; 701/22; 180/65.21

(58) Field of Classification Search
USPC ...................................... 701/3, 22; 180/65.21
See application file for complete search history.

(56) References Cited

U.S. PATENT DOCUMENTS

2004/0074682 A1* 4/2004 Fussey et al. ................. 180/65.2

2009/0105896 A1* 4/2009 Tamai et al. .................... 701/22

* cited by examiner

*Primary Examiner* — Mary Cheung
*Assistant Examiner* — Yuen Wong
(74) *Attorney, Agent, or Firm* — Donna P. Suchy; Daniel M. Barbieri

(57) ABSTRACT

A system for controlling power of a hybrid vehicle may include a controller configured to receive a signal indicative of a commanded acceleration for the hybrid vehicle and determine a potential for each of a power source, a generator, and an energy storage device to supply energy to achieve the commanded acceleration. The controller may be further configured to determine a cost associated with using each of the power source, the generator, and the energy storage device to achieve the commanded acceleration, and determine a combination of the power source, the generator, and the energy storage device that achieves the commanded acceleration at a lowest total cost. The controller may also be configured to provide a signal to at least one of the power source, the generator, and the energy storage device to achieve the commanded acceleration based on the determined combination.

17 Claims, 5 Drawing Sheets

SYSTEM AND METHOD FOR CONTROLLING POWER IN A HYBRID VEHICLE USING COST ANALYSIS

FIELD OF THE DESCRIPTION

The present disclosure relates to systems and methods for controlling power in a hybrid vehicle. In particular, the present disclosure relates to systems and methods for controlling power in a hybrid vehicle using a cost analysis.

BACKGROUND

In order to increase efficiency and reduce undesirable emissions during operation of internal combustion engines, hybrid vehicles have been developed in an attempt to recover energy previously lost during operation of the vehicle. Such systems typically operate by storing energy previously lost during operation or deceleration of the vehicle. For example, such systems may include braking systems that harness the kinetic energy lost as the speed of the vehicle is reduced. For example, braking may be accomplished at least in part using generators or flywheels to reduced the speed of the vehicle. Energy previously lost during deceleration, primarily in the form of heat, may be stored in batteries, capacitors, and/or flywheels. Once stored, the energy may be used to provide electric power to one or more electric motors to assist with propelling the vehicle, for example, during acceleration.

Although such systems are effective in improving efficiency and reducing undesirable emissions during operation of a vehicle, it would be desirable to provide a system and method for controlling the manner in which the energy associated with a hybrid vehicle is stored and consumed such that overall efficiency of the hybrid vehicle is improved and/or the amount of undesirable emissions is further reduced. The systems and methods described herein may improve the efficiency and/or reduce undesirable emissions associated with operation a hybrid vehicle.

SUMMARY

In the following description, exemplary embodiments will be presented. It should be understood that the invention, in its broadest sense, could be practiced without having one or more features of the exemplary embodiments.

In one aspect, a system for controlling power of a hybrid vehicle may include a controller configured to receive a signal indicative of a commanded acceleration for the hybrid vehicle and determine a potential for each of a power source, a generator, and an energy storage device to supply energy to achieve the commanded acceleration. The controller may be further configured to determine a cost associated with using each of the power source, the generator, and the energy storage device to achieve the commanded acceleration, and determine a combination of the power source, the generator, and the energy storage device that achieves the commanded acceleration at a lowest total cost. The controller may also be configured to provide a signal to at least one of the power source, the generator, and the energy storage device to achieve the commanded acceleration based on the determined combination.

According to another aspect, a hybrid vehicle may include at least one propulsion member, a power source configured to supply energy to the hybrid vehicle, and a generator operably coupled to at least one of the power source and the propulsion member. The hybrid vehicle may further include an energy storage device, and a transmission operably coupled to the at least one propulsion member, the transmission being configured to receive energy from at least one of the power source, the generator, and the energy storage device, and provide torque to the at least one propulsion member. The hybrid vehicle may further include a controller configured to receive a signal indicative of a commanded acceleration for the hybrid vehicle and determine a potential for each of the power source, the generator, and the energy storage device to supply energy to achieve the commanded acceleration. The controller may be further configured to determine a cost associated with using each of the power source, the generator, and the energy storage device to achieve the commanded acceleration, and determine a combination of the power source, the generator, and the energy storage device that achieves the commanded acceleration at a lowest total cost. The controller may be further configured to provide a signal to at least one of the power source, the generator, and the energy storage device to achieve the commanded acceleration based on the determined combination.

According to a further aspect, a computer-implemented method for controlling power of a hybrid vehicle may include receiving by a processor a signal indicative of a commanded acceleration for the hybrid vehicle and determining by the processor a potential for each of a power source, a generator, and an energy storage device to supply energy to achieve the commanded acceleration. The method may further include determining by the processor a cost associated with using each of the power source, the generator, and the energy storage device to achieve the commanded acceleration, and determining by the processor a combination of the power source, the generator, and the energy storage device that achieves the commanded acceleration at a lowest total cost. The method may further include providing by the processor a signal to at least one of the power source, the generator, and the energy storage device to achieve the commanded acceleration based on the determined combination.

Aside from the structural and procedural arrangements set forth above, the invention could include a number of other arrangements such as those explained hereinafter. It is to be understood that both the foregoing description and the following description are exemplary only.

BRIEF DESCRIPTION OF THE DRAWINGS

The accompanying drawings are incorporated in and constitute a part of this description. The drawings illustrate exemplary embodiments and, together with the description, serve to explain some principles of the invention. In the drawings.

DESCRIPTION OF EXEMPLARY EMBODIMENTS

Figure 1:
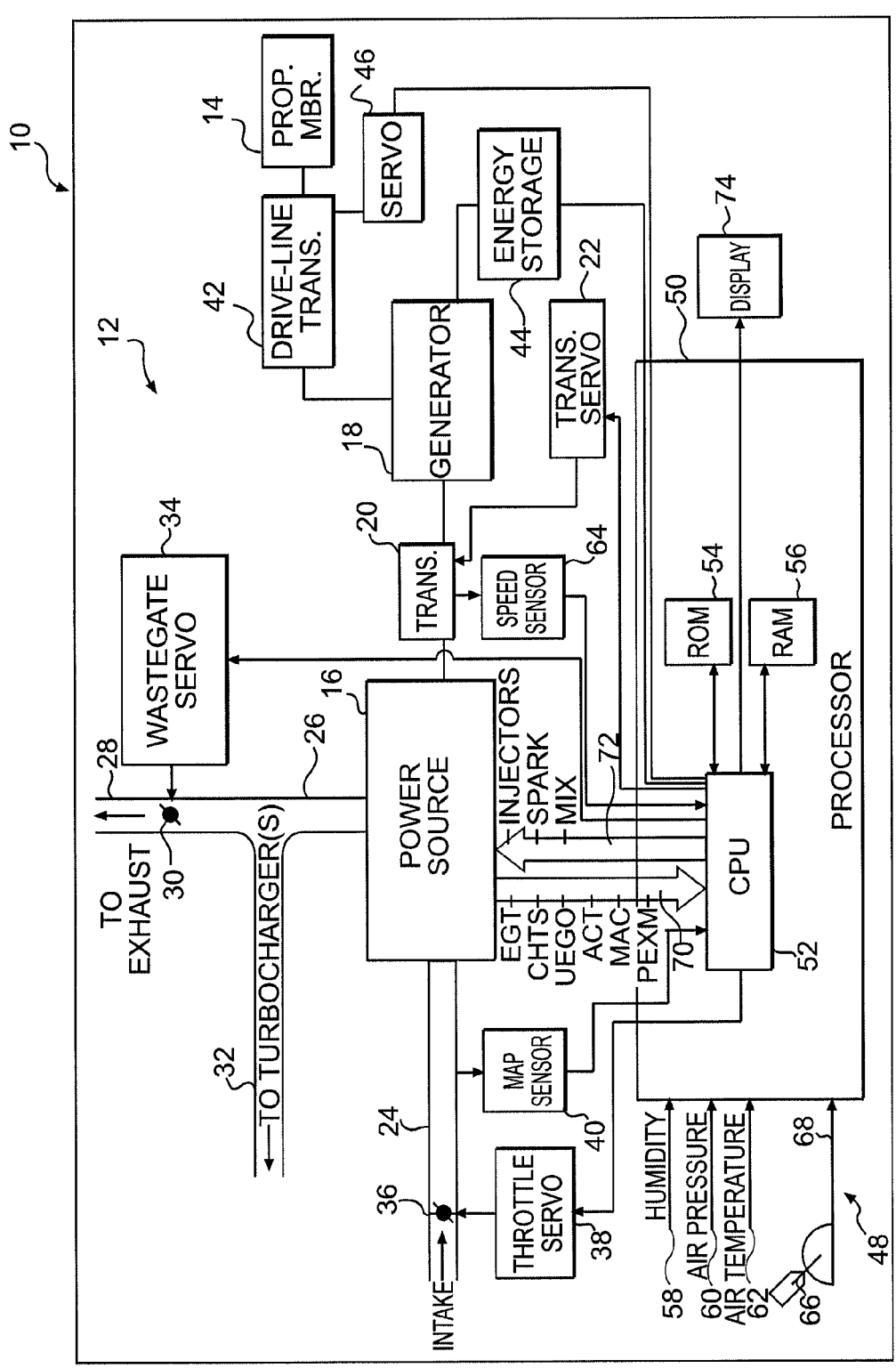
FIG. 1 is a schematic block diagram of an exemplary embodiment of a hybrid vehicle including an exemplary power system.

Reference will now be made in detail to exemplary embodiments of the invention. Wherever possible, the same reference numbers are used in the drawings and the description to refer to the same or like parts.

FIG. 1 depicts an exemplary embodiment of a hybrid vehicle 10 including an exemplary hybrid power system 12 for supplying power to one or more propulsion members 14 (e.g., one or more wheels, propellers, and/or fans) configured to propel the hybrid vehicle 10 and/or provide power to various electrically-powered components of the hybrid vehicle 10. The hybrid vehicle 10 may be a water-borne vehicle including submarines, ships, and boats; a ground vehicle including cars and trucks; a rail vehicle including trains; an air vehicle; and a space vehicle. The vehicle 10 may be a manned or unmanned vehicle.

The exemplary power system 12 includes a power source 16 configured to convert potential energy into mechanical power. For example, the power source 16 may be configured to convert potential energy supplied by fuel into rotational power. Power source 16 may be an internal combustion engine, such as, for example, a two-stroke engine, a four-stroke engine, a spark-ignition engine, a compression-ignition engine, a rotary engine, or a gas turbine engine. The internal combustion engine may be configured to combust fuel, such as, for example, gasoline, diesel fuel, bio-diesel, methanol, ethanol, natural gas, kerosene, aviation fuel, jet fuel, fuel oil, and/or combinations thereof (e.g., E85 (i.e., a blend of 15% gasoline and 85% ethanol)). According to some embodiments, additional power sources may be included, such as solar-power and/or power from a fuel-cell.

The power source 16 may be operably coupled to a generator 18 configured to convert mechanical power supplied by the power source 16 into electric power. For example, the power source 16 may be operably coupled to generator 18 via a transmission 20. The transmission 20 may be configured to provide a coupling between the power source 16 and the generator 18 that results in a constant ratio of input speed to output speed, or the transmission 20 may be configured to provide differing ratios of input speed to output speed. For example, the transmission 20 may include a gear box, which may be selectively operated such that the ratio of the speed of the power source 16's output to the generator 18's input may be changed. According to some embodiments, the transmission 20 may provide discrete ratios by operating such that different combinations of gears engage one another. According to some embodiments, the transmission 20 may be a continuously-variable transmission.

The exemplary power system 12 may include a transmission servo 22 configured to change the effective gear ratio of the transmission 20, so that speed of the generator 18 may be changed relative to the speed of the power source 16. For example, the power system 12 may be operated such that the power source 16 operates at a speed and torque and/or such that the generator 18 may be operated at a speed such that the efficiency of the power system 12 is improved or optimized. The speed and/or torque of the operation of the power source 16 may be selected such that the power source 16's efficiency is improved or optimized based on, for example, ambient air conditions. Further, the generator 18's speed of operation may be optimized based on, for example, the amount of power load placed on the power system 12. For example, the efficiency of the power system 12 may be improved or optimized by monitoring environmental conditions and selecting set-points for controlling the power source 16's speed and/or the generator 18's output based on known performance responses of the power system 12.

According to the exemplary embodiment depicted in FIG. 1, the power source 16 includes an intake manifold 24 and an exhaust manifold 26. The exhaust manifold 26 may be in flow communication with a conduit 28 configured to provide a path for gases generated during the combustion process to be evacuated from the power source 16 to the surroundings. According to some embodiments, the exhaust manifold 26 may be in flow communication with a conduit configured to supply at least a portion of the gases generated during the combustion process to one or more turbochargers (not shown). The turbocharger(s) may be configured to increase the manifold air pressure (MAP) of the power source 16. The exhaust manifold 26 may be in flow communication with a wastegate valve 30 configured to control the portion of exhaust gases that flow to the turbocharger(s) via conduit 32 instead of to the surroundings via conduit 28. According to some embodiments, operation of the wastegate valve 30 may be controlled via a wastegate servo 34, such that the portion of the exhaust gases flowing via conduit 28 to the surroundings may be changed, which, in turn, controls the portion of the exhaust gases supplied to the turbocharger(s). For example, the wastegate servo 34 may be configured to control the position of the wastegate valve 30 in response to feedback from a measured intake manifold air pressure (MAP).

According to some exemplary embodiments, a movable throttle valve 36 may be associated with the intake manifold 24, as depicted in FIG. 1. The throttle valve 36 may be controlled via, for example, a throttle servo 38. The power system 12 may include a manifold air pressure (MAP) sensor 40 configured generate a signal indicative of the intake MAP.

According to some embodiments of the hybrid vehicle 10, the generator 18 may be operably coupled to a drive-line transmission 42, and the power source 16 supplies the generator 18 with mechanical power. According to some embodiments, the power source 16 is not coupled to the drive-line transmission 42 such that mechanical power is supplied to the drive-line transmission 42. Rather, the power source 16 provides mechanical power solely to the generator 18. This type of arrangement is sometimes referred to as a "series hybrid" configuration.

According to some embodiments, the drive-line transmission 42 may be a continuously-variable transmission, which includes one or more electric motors operably coupled to the generator 18 and the propulsion member(s) 14 of the hybrid vehicle 10. For example, the drive-line transmission 42 may include an electric motor (not shown) operably coupled to a differential and drive shafts (not shown), which in turn, are operably coupled to the propulsion member(s) 14. According to some embodiments, the drive-line transmission 42 may include two or more electric motors, each operably coupled to a propulsion member 14 of the hybrid vehicle 10. According to some embodiments, the drive-line transmission 42 may include one or more electric motors (not shown) operably coupled a gear box (not shown) configured to provide differing ratios between the speed of the electric motor output shaft(s) and the input shaft of the gear box. The gear box may be operably coupled to one or more propulsion members 14 of the hybrid vehicle 10 (e.g., via a differential and drive shaft(s)). According to some embodiments, the gear box of the drive-line transmission 42 may provide discrete gear ratios by engaging different combinations of gears. According to these embodiments, the one or more electric motors may be operated, for example, at a relatively constant speed, and the hybrid vehicle 110 may be operated at different speeds via changing the effective gear ratio of the gear box, which may be a continuously-variable transmission.

According to some embodiments, the hybrid vehicle 10 may include one or more energy storage devices 44, such as one or more batteries, capacitors, and/or flywheels. For example, the energy storage devices 44 may be configured to store excess electric energy generated by the generator 18 and/or kinetic energy (i.e., via a flywheel). The stored energy may be used, for example, by electric motor(s) of the drive-line transmission 42, for example, when more electric power is desired for propelling the hybrid vehicle 10 and/or to improve or optimize efficiency of the power system 12 of the hybrid vehicle 10.

The power system 12 may include a drive-line transmission servo 46 configured to change the effective gear ratio of the gear box of the drive-line transmission 42. For example, the power system 12 may be operated such that the power source 16 operates at a speed and torque and/or such that the gear box of the drive-line transmission 42 provides an effective gear ratio for improving and/or optimizing the efficiency of the power system 12 at a desired power output and/or vehicle speed. The speed and/or torque of the operation of the power source 16 may be selected such that the power source 16's efficiency is improved and/or optimized based on, for example, ambient air conditions. Further, the drive-line transmission 42's effective gear ratio may be optimized based on, for example, the amount of power load placed on the power system 12. For example, the efficiency of the power system 12 may be improved or optimized by monitoring environmental conditions and selecting set-points for controlling the power source 16's speed and/or the drive-line transmission 42's effective gear ratio based on known performance responses of the power system 12.

The exemplary hybrid vehicle 10 shown in FIG. 1 includes a control apparatus 48 more generally referred to as a controller. The control apparatus 48 may include a processor 50 configured to receive signals indicative of an operator's commanded power output 67 (see FIG. 2) for the hybrid vehicle 10, signals indicative of environmental conditions (e.g., ambient air conditions), and signals indicative of various parameters associated with the components of the hybrid vehicle 10's power system 12. Based on these signals, the processor 50 may determine one or more control settings for the components of the power system 12 for improving or optimizing the efficiency of the hybrid vehicle 10 and power system 12.

According to some embodiments, the processor 50 may include a full authority digital electronic control (FADEC). For example, the processor 50 may include a central processing unit (CPU) 52, read only memory (ROM) 54, and/or random access memory (RAM) 56. According to some embodiments, the processor 50 may be a 16-bit micro-processor based on, for example, an INTEL microprocessor (e.g., a microprocessor used in previous generations of FORD engine electronic control units). The FADEC may be configured to meter fuel and control fuel injection, for example, via a speed-density method, and the FADEC may include a distributorless electronic ignition having a double-fire capacity. According to some embodiments, the processor 50 may be housed within a sealed enclosure and/or may be cooled via air and/or liquid cooling, for example, for high altitude applications.

The exemplary processor 50 of the hybrid vehicle 10 may include one or more memories on which is stored executable instructions that implement methods of power control or other hardware that implements physical logic for controlling power (generally referred to as "control logic"). For example, the processor 50 may determine control settings for the components of the power system 12, such as, for example, the power source 16, the generator 18, the transmission servo 22, the energy storage device 44, the drive-line transmission 42 (including the one or more electric motors and gear box), the drive-line transmission servo 46, the turbocharger(s), the wastegate valve 30, the wastegate servo 34, the throttle valve 36, the throttle servo 38, the ignition, the air-fuel mixture, the fuel injection timing and/or the amount of fuel injected, and/or the timing and/or duration of the opening and closing of the intake valves and/or exhaust valves of the power source 16. Furthermore, the control process logic may be implemented with digital information stored in computer software and/or hardware incorporated into the processor 50. The processor 50 may be configured to receive signals indicative environmental conditions, signals indicative of operating parameters associated with the components of the power system 12, and signals indicative of the commanded power output 67 (see FIG. 2) of the power system 12. Based on these signals, the processor 50 may control power of the hybrid vehicle and output control settings for the components of the power system 12, for example, at the end of each control cycle.

The processor 50 may be configured to receive information relating to the environmental conditions present during operation of the power system 12. For example, the processor 50 may receive signals indicative of the ambient air conditions, such as, for example, the wind velocity, the humidity 58, the static and/or dynamic air pressure 60, and/or the air temperature 62. The processor 50 may also be configured to receive information relating to the operation of the power source 16. For example, the processor 50 may receive signals from various sensors related to the operating parameters associated with the power source 16, such as, for example, signals indicative of an engine speed from an engine speed sensor 64 and/or the MAP from the MAP sensor 40. According to some embodiments, the processor 50 may be configured to receive signals indicative of exhaust gas temperature (EGT), cylinder head temperature (CHT), universal exhaust gas oxygen (UEGO), air charge temperature (ACT), mass airflow (MAF), and/or exhaust pressure (PEXH). The processor 50 may be configured to receive a signal indicative of a commanded power output 67 for the power system 12 via, for example, an input device 66 and a communication link 68 (hard-wired or wireless). The above-mentioned signal(s) may be received by processor 50 via a bus 70, for example, as shown in FIG. 1, and/or via wireless transmission. According to some embodiments, these signals may include, for example, analog signals, which may range between about −10 volts and about +10 volts (e.g., between about −5 volts and about 5 volts), and/or these signals may be in the form of digital signals.

According to some exemplary embodiments, the processor 50 is configured to receive one or more of the above-mentioned signals and provide control signals to one or more of the throttle servo 36, the transmission servo 22, and the wastegate servo 34. For example, the CPU 52 may provide control signals to one or more of the throttle servo 36, the transmission servo 22, and the wastegate servo 34, as depicted in FIG. 1.

According to some exemplary embodiments, the processor 50 may also be configured to provide control signals to control, for example, the turbocharger(s), the ignition timing (e.g., the spark timing for a spark ignition engine), the air-fuel mixture, the fuel injection timing and/or the amount of fuel injected, and/or the timing and/or duration of the opening and closing of the intake valves and/or exhaust valves of the power source 16. The control signals may be carried via a bus 72 and/or via a wireless link. According to some embodiments, the control signals may be in the form of analog signals ranging from about 0 volts to about 5 volts, and/or the control signals may be in the form of digital signals.

The exemplary power system 12 may include a display 74 operably coupled to the processor 50, and the display 74 may be configured to display information relating to the operation of the power system 12, such as, for example, a desired MAP setting and/or a desired generator speed setting. For example, according to some embodiments, the processor 50 may determine settings for improving or optimizing the efficiency of the power system 12, and the processor 50 may display to an operator one or more of those settings via the display 74. For example, the display 74 may display an MAP setting, a generator speed setting, and/or a throttle servo setting. The operator may be provided with controls that enable the operator to manually supply control signals to one or more of the various controllable components of the power system 12, such that one or more of the processor-determined settings may be achieved. According to some embodiments, for example, as outlined previously, the processor 50 may automatically supply control signals to one or more of the various controllable components of the power system 12, such that one or more of the processor-determined settings may be achieved.

Figure 2:
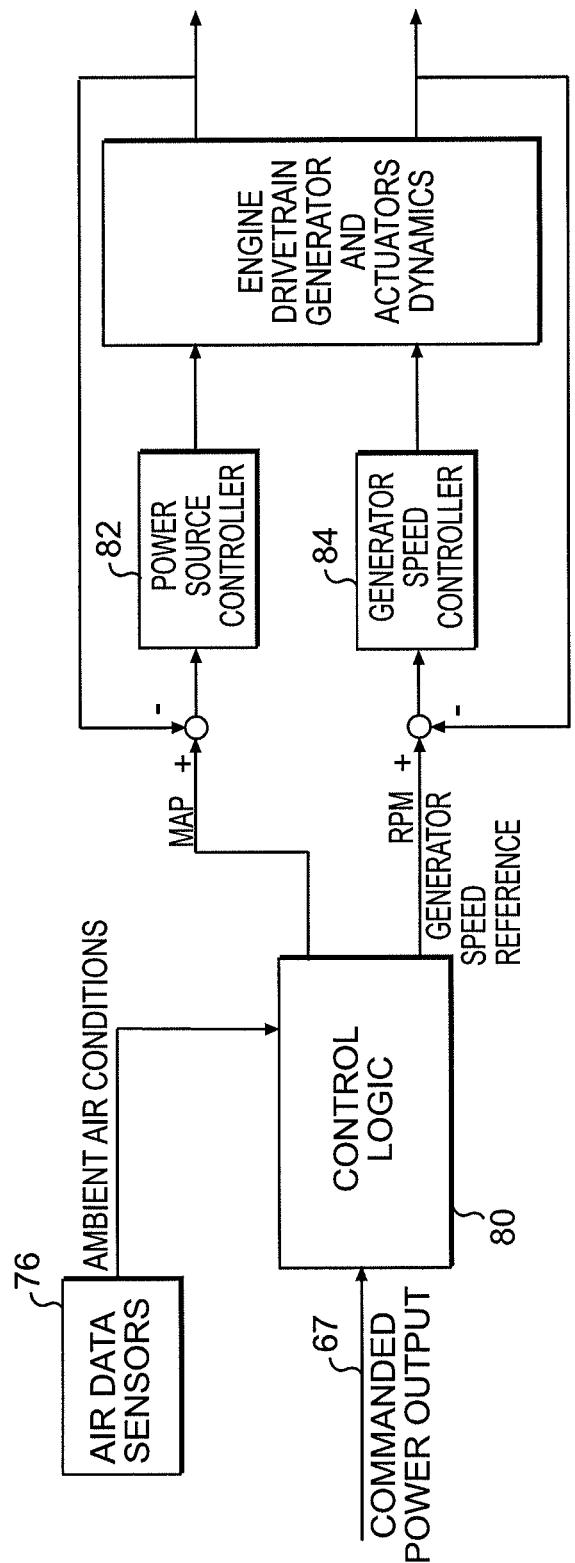
FIG. 2 is a functional block diagram for the exemplary embodiment shown in FIG. 1.

FIG. 2 is a block diagram showing the function of an exemplary embodiment of the power system 12. In the exemplary embodiment, the processor 50 receives signals indicative of detected environmental conditions along with a signal indicative of a commanded power output 67 (see FIG. 2) of the power system 12. For example, the detected environmental conditions may be detected via one or more air data sensors 76, and the commanded power output 67 may be received from the input device 66 (see FIG. 1). These signals may be received by, for example, a FADEC of the processor 50. Upon receipt of these signals, the processor 50 may use a process implemented with instructions and/or hardware logic to access one or more look-up tables and/or maps stored in the ROM 54 and/or RAM 56. The look-up tables and/or maps may provide control settings, for example, a power source speed command, an MAP command, and/or a generator speed command, which may result in improved or optimized efficiency of the power output of the power system 12 based at least partially on the signals indicative of detected environmental conditions and/or the commanded power output 67. Instead of (or in addition to) look-up tables and/or maps, the processor 50 may determine the control settings via real-time calculations via mathematical relationships, such as theoretically and/or empirically-derived equations, which may be accessed by the processor 50.

According to some embodiments, the control process instructions or logic, the look-up tables, maps, and/or mathematical equations may be supplied or coupled to the processor 50 via one or more digital storage devices, such as disks, memory cards, memory sticks, and/or flash drives. According to some embodiments, the control process instructions or logic, look-up tables, maps, and/or mathematical equations may be provided via a separate computer, for example, via a physical link and/or wireless link. According to some embodiments, the computer may provide an operator with advisory messages in addition to or in lieu of providing control signals to the power system 12 to activate the control servos and other controllable components of the power system 12.

According to the exemplary embodiment depicted in FIG. 2, the power system 12 (i.e., the processor 50) monitors signals received from the air data sensors 76. The signals may be supplied to one or more control algorithms 80, which may be configured to determine a combination of the power source 16's operating speed, the power source 16's power output or load setting, and/or the generator 18's operating speed to improve or optimize the power output efficiency of the power system 12. For example, the power source 16's operating speed, the power source 16's power output or load setting, and/or the generator 18's operating speed may be determined such that the maximum efficiency of the combined power source 16 and generator 18 is achieved for the detected environmental conditions.

During operation according to some embodiments, an operator of the power system 12 supplies a commanded power output 67 via operation of the input device 66 (see FIG. 1). The control logic (e.g., subroutine(s) running in the FADEC) receives the commanded power output 67 and generate a signal indicative of an MAP set-point, which, in turn, is received by a power source controller 82. The power source controller 82, according to some embodiments, supplies a signal that serves to operate the throttle servo 38 and/or the wastegate servo 34 (see FIG. 1) to achieve an inlet MAP corresponding to the operator's commanded power output 67. According to some embodiments, the power source 16 does not include a turbocharger, the power source controller 82 transmits a signal that serves to operate the throttle servo 38 alone to achieve an inlet MAP corresponding to the operator's commanded power output 67. The control logic of the control process 80 may also be configured to output a generator speed set-point, which may be received by a generator speed controller 84. The generator speed controller 84 may be configured to operate the transmission servo 22 such that the transmission 20 provides a gear ratio resulting in a generator speed that substantially matches the generator speed set-point. The operating speed of the generator 18 may be sensed via a speed sensor 64 operably coupled to the transmission 20.

According to some exemplary embodiments, the control logic 80 may use signals from the input device 44 to determine the MAP and engine speed that will improve or optimize efficiency of the power output at the commanded power output 67 (e.g., via interpolation of data found in look-up tables and/or maps stored in the ROM 54 and/or RAM 56).

The power output and/or specific fuel consumption of the power source 16 may be controlled by at least two primary variables, such as, for example, MAP and engine speed. The power output and specific fuel consumption of the power source 16 are related to MAP and engine speed, and those relationships may be determined via testing and/or may be predicted. The relationships between power output, specific fuel consumption, MAP, and/or engine speed may be incorporated into look-up tables and/or maps, and/or may be characterized by mathematical equations. Operation of the generator 18 may be characterized by a power coefficient and efficiency in relation to advance ratio, which, in turn, are functions of generator speed, density, and load on the generator. The relationships between the generator 18's power coefficient, efficiency, advance ratio, generator speed, density, and load may be incorporated into look-up tables and/or maps, or may be characterized by mathematical equations. According to some embodiments, the processor 50 may include one or more algorithms configured to improve or optimize the power system 12's efficiency based on one or more of the relationships between the power source 16's power output, specific fuel consumption, MAP, and engine speed, and/or one or more of the relationships between the generator 18's power coefficient, efficiency, advance ratio, generator speed, density, and load.

According to some embodiments, the processor 50 may output a set of engine speed and MAP data, which correspond to the environmental conditions and commanded power outputs. These data may be stored in the processor 50 (e.g., in the FADEC) in look-up table and/or map form. The data may be supplied directly from the look-up tables and/or maps and/or may be interpolated to obtain engine speed and/or MAP settings for rendering improved or optimum efficiency of power source 16 corresponding to a given set of environmental conditions and commanded power output.

Figure 3:
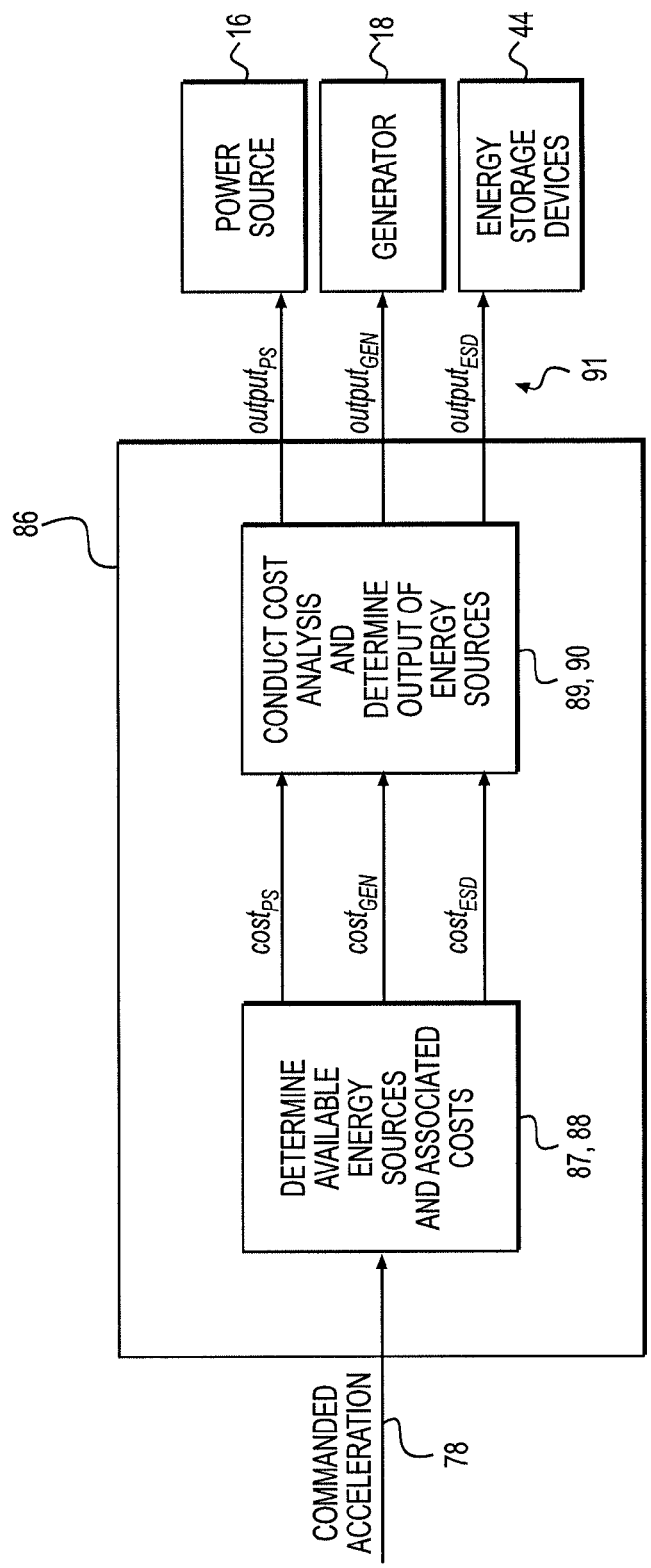
FIG. 3 is a functional block diagram for an exemplary method for controlling power.

As shown in FIG. 3, in order to improve the efficiency and/or reduce undesirable emissions of the hybrid vehicle 10, a controller 86 may be provided (e.g., including processor 50 and/or other processors) and may be configured to implement a cost analysis associated with achieving a commanded acceleration 78 of the hybrid vehicle 10. According to some embodiments, the cost analysis includes evaluating the commanded acceleration 78, the energy sources available to meet the commanded acceleration 78, and the cost associated with using each of the available energy sources to meet the commanded acceleration 78. Based on the cost analysis, the controller 86 determines which energy source, or combination of energy sources, will be used to meet the commanded acceleration 78. For example, the controller 86 will select the energy source or combination thereof that meets the commanded acceleration 78 with the least cost and controls operation of those energy sources accordingly.

According to the exemplary embodiment shown in FIG. 1, the power source 16, the generator 18, and the energy storage devices 44 are potential sources of energy for achieving a commanded acceleration 78. Each of those energy sources has a potential level of energy for achieving the commanded acceleration 78, either individually or in combination with one or more other energy sources.

The potential level of energy may be time dependent. For example, if the power source 16 is an internal combustion engine, at a given point in time, it may operating at an instantaneous engine speed, with an instantaneous torque and power output. Further, the engine has the potential to provide more power within a given time period. Similarly, the generator 18 has at a given point in time, the ability to provide an instantaneous level of power output and a potential, based on operation of the power source 16, to increase that power output within a given time period. The energy storage devices 44 may include batteries, capacitors, and/or flywheels, and those energy storage devices 44 also have at a given time period, the ability to supply a discrete amount of energy to accelerate the hybrid vehicle 10 via one or more electric motors. Thus, at any given point in time during which a change in velocity of the hybrid vehicle may be commanded, the power source 16, generator 18, and energy storage devices 44 each have a potential ability to meet, or assist with meeting, the commanded acceleration 78, either individually or in combination.

Figure 4:
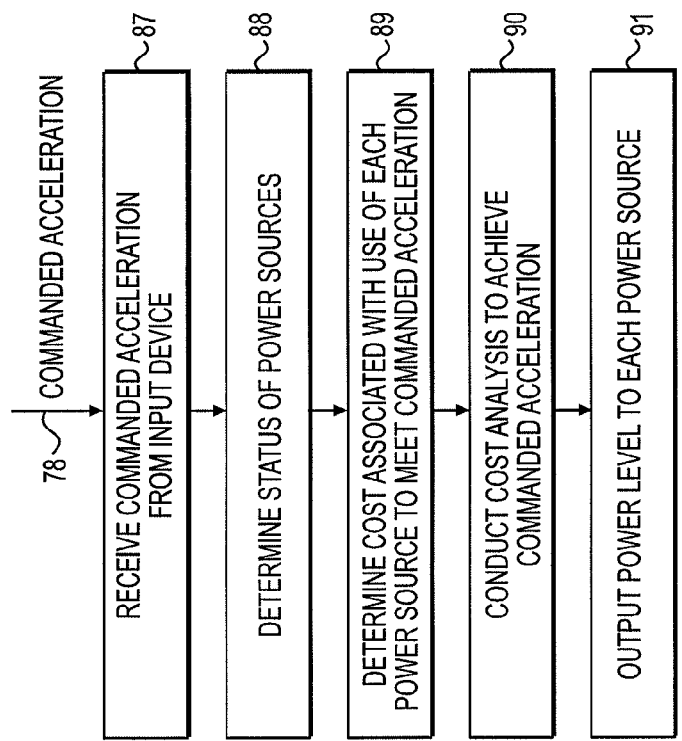
FIG. 4 is a flowchart for an exemplary method for controlling power.

As shown in FIGS. 3 and 4, the controller 86 may configured at step 87 to receive the commanded acceleration 78 from the input device 66, and at step 88 determine for each of the power source 16, the generator 18, and the energy storage devices 44 the availability to contribute to meeting the commanded acceleration 78, and at step 89 determine a cost associated with respective uses of those energy sources ($cost_{PS}$, $cost_{GEN}$, and $cost_{ESD}$) to meet the commanded acceleration 78. For example, if the power source 16 is an internal combustion engine, costs $cost_{PS}$ associated with its use to achieve the commanded acceleration 78 may include fuel consumption and undesirable emissions. In particular, costs associated with operation of an internal combustion engine may include, for example, the cost of fuel for providing the desired power output associated with achieving the commanded acceleration 78, the reduction in the amount of fuel remaining in a fuel tank, and costs associated with undesirable emissions from operation of the internal combustion engine at a desired power output. These costs may be attributed to operation of the power source 16 to achieve the commanded acceleration 78, and such costs may be stored in maps or look-up tables, and/or calculated real-time according to one or more mathematical formulas.

Similarly, operation of the generator 16 and/or use of the energy storage devices 44 may be assigned respective costs $cost_{GEN}$ and $cost_{ESD}$ for operation to meet the commanded acceleration 78. For example, similar to the power source 16, the operation of the generator 18 may be assigned costs corresponding to fuel consumption to operate the generator and costs associated with undesirable emissions associated therewith. The energy storage devices 44 may be assigned costs $cost_{ESD}$ associated with the loss of potential to provide energy if used. For example, if a battery has a certain level of charge, use of a portion of that level of charge may be considered a cost associated with use of the battery. Similar costs may be associated with using capacitors and/or flywheels to supply energy to meet the commanded acceleration 78. These costs may be attributed to operation of the generator 18 and/or the energy storage devices 44 to achieve the commanded acceleration 78, and such costs may be stored in maps or look-up tables, and/or calculated real-time according to one or more mathematical formulas.

During operation, the controller 86 may be configured to perform a cost analysis at step 90 upon receipt of a commanded acceleration 78 from input device 66. For example, upon receipt of the commanded acceleration 78, the controller 86 may determine the ability at that time of the power source 16, the generator 18, and/or the energy storage devices 44 to supply energy to meet the commanded acceleration 78. The controller 86 may also determine the cost associated with the use at that time of each of the power source 16, the generator 18, and the energy storage devices 44. Thereafter, the controller 86 may select one or a combination of the power source 16, the generator 18, and the energy storages devices 44 to meet the commanded acceleration 78 in the manner results in the least cost according to the costs associated with using the power source 16, the generator 18, and the energy storage devices 44. Thereafter, the controller 86 may at step 91 output the level of power to be supplied by each of the power source 16, the generator 18, and the energy storage devices 44 ($output_{PS}$, $output_{GEN}$, and $output_{ESD}$).

According to some embodiments, the cost analysis may be dependent on the level of commanded acceleration 78. For example, if the commanded acceleration 78 is at a maximum level according to the input device 66, the controller 86 may determine that energy should be supplied at the maximum available rate from the power source 16, the generator 18, and the energy storage devices 44. However, when the commanded acceleration 78 is below the maximum level according to the input device 66, the controller 50 may be configured to select one or a combination of the power source 16, the generator 18, and the energy storages devices 44 that will meet the commanded acceleration 78 in the most cost-effective manner.

Figure 5:
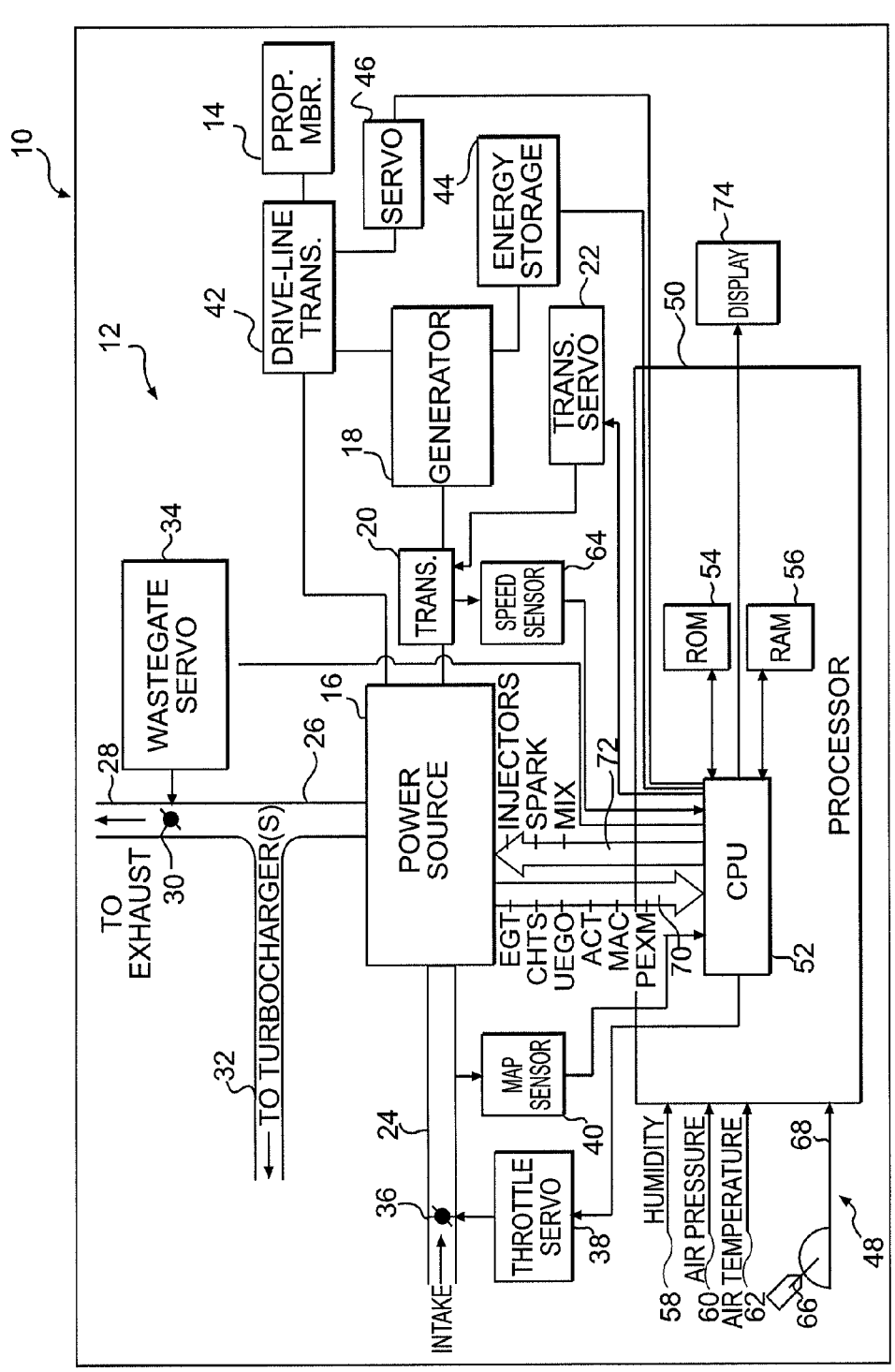
FIG. 5 is a schematic block diagram of another exemplary embodiment of a hybrid vehicle including an exemplary power system.

According to some embodiments of the hybrid vehicle 10, for example, as schematically-depicted in FIG. 5, the power source 16 may be operably coupled to the drive-line transmission 42 and the generator 18 via mechanical links, such that the power source 16 may selectively supply mechanical power to each of the drive-line transmission 42 and the generator 18. Such a configuration is sometimes referred to as a "parallel hybrid" configuration. The drive-line transmission 42 may include one or more electric motors (not shown) and/or a gear box (not shown) in a similar manner as described previously herein with reference to the exemplary embodiment of FIG. 1. According to some embodiments, the power source 16 and the electric motor(s) may be configured to selectively operate independent of one another and/or in a complimentary manner to provide power to the drive-line transmission 42's gear box, such that the hybrid vehicle 10 may be propelled via one or more propulsion members 14, according to an operator's commanded acceleration 78.

The exemplary hybrid vehicle 10 shown in FIG. 5 includes a control apparatus 48 including a processor 50 configured to receive signals indicative of an operator's commanded acceleration 78, signals indicative of environmental conditions (e.g., ambient air conditions), and/or signals indicative of various parameters associated with the components of the power system 12. Based on these signals, the processor 50 determines one or more control settings for the components of the power system 12 for improving or optimizing the efficiency of the hybrid vehicle 10's power system 12. For example, the hybrid vehicle 10 may include a processor 50 at least similar to the exemplary processor 50 described previously herein.

Similar to the exemplary embodiment of power system 12 of FIG. 1, the exemplary processor 50 of the hybrid vehicle 10 may include one or more power controller algorithms as described previously herein. For example, the processor 50 may determine control settings for the components of the power system 12, such as, for example, the power source 16, the generator 18, the transmission servo 22, the energy storage device 44, the drive-line transmission 42 (including the one or more electric motors and gear box), the drive-line transmission servo 46, the turbocharger(s), the wastegate valve 30, the wastegate servo 34, the throttle valve 36, the throttle servo 38, the ignition, the air-fuel mixture, the fuel injection timing and/or the amount of fuel injected, and/or the timing and/or duration of the opening and closing of the intake valves and/or exhaust valves of the power source 16. Furthermore, the control algorithm(s) may be in the form of digital information stored in computer software and/or hardware incorporated into the processor 50. The processor 50 may be configured to receive signals indicative of environmental conditions, signals indicative of operating parameters associated with the components of the power system 12, and signals indicative of the commanded power output. Based on these signals, the processor 50 performs the control algorithm(s) and outputs control settings for the components of the power system 12, for example, at the end of each control cycle. Furthermore, the processor 50 may be configured to allocate mechanical power between the generator 18 and the drive-line transmission 42 such that the efficiency of the power system 12 is improved or optimized.

In addition, in order to improve the efficiency and/or reduce undesirable emissions of the hybrid vehicle 10, a controller 86 may be provided and configured to implement a cost analysis similar to the cost analysis described with respect to the exemplary embodiment shown in FIG. 1. For example, the cost analysis may include evaluating the commanded acceleration 78, the energy sources available to meet the commanded acceleration 78, and the cost associated with using each of the available energy sources to meet the commanded acceleration 78. Based on the cost analysis, the controller 86 may determine which energy source, or combination of energy sources, will be used to meet the commanded acceleration 78. For example, the controller 86 will select the energy source or combination thereof that meets the commanded acceleration 78 with the least cost and controls operation of those energy sources accordingly.

It will be apparent to those skilled in the art that various modifications and variations can be made to the structures and methodology described herein. Thus, it should be understood that the invention is not limited to the subject matter discussed in the description. Rather, the present invention is intended to cover modifications and variations.

What is claimed is:

1. A system for controlling power of a hybrid vehicle, the hybrid vehicle comprising a power source, a generator, and an energy storage device, the system comprising;
   a controller configured to:
      receive a signal indicative of a commanded acceleration for the hybrid vehicle;
      determine a potential for each of the power source, the generator, and the energy storage device to supply energy to achieve the commanded acceleration;
      determine a cost associated with using cacti of the power source, the generator, and the energy storage device to achieve the commanded acceleration;
      determine a combination of the power source, the generator, and the energy storage device that achieves the commanded acceleration at a lowest total cost; and
      provide a signal to at least one of the power source, the generator, and the energy storage device to achieve the commanded acceleration based on the determined combination,
      wherein the cost associated with use of the energy storage device to assist with achieving the commanded acceleration is based on a first level of energy stored in the energy storage device and an estimated amount of time required to restore energy to the energy storage device to the first level of stored enemy if the energy of the energy storage device is used to assist with achieving the commanded acceleration.

2. The system of claim 1, wherein the cost associated with using the power source to assist with achieving the commanded acceleration comprises a cost associated with fuel consumption resulting from operation of the power source to achieve the commanded acceleration and a cost associated with undesirable emissions resulting from operation of the power source to achieve the commanded acceleration.

3. The system of claim 1, wherein the cost associated with using the generator to assist with achieving the commanded acceleration comprises a cost associated with fuel consumption resulting from operation of the power source to operate the generator to achieve the commanded acceleration and a cost associated with undesirable emissions resulting from operation of the power source to operate the generator to achieve the commanded acceleration.

4. The system of claim 1, wherein the power source comprises at least one internal combustion engine.

5. The system of claim 1, wherein the energy storage device comprises at east one of a battery, a capacitor, and a flywheel.

6. A hybrid vehicle comprising:
   at least one propulsion member;
   a power source configured to supply energy to the hybrid vehicle;
   a generator operably coupled to at least one of the power source and the propulsion member;
   an energy storage device;
   a transmission operably coupled to the at least one propulsion member, the transmission being configured to receive energy from at least one of the power source, the generator, and the energy storage device, and provide torque to the at least one propulsion member; and
   a controller configured to:
      receive a signal indicative of a commanded acceleration for the hybrid vehicle;
      determine a potential for each of the power source, the generator, and the energy storage device to supply energy to achieve the commanded acceleration;

determine a cost associated with using each of the power source, the generator, and the energy storage device to achieve the commanded acceleration;

determine a combination of the power source, the generator, and the energy storage device that achieves the commanded acceleration at a lowest total cost; and provide a signal to at least one of the power source, the generator, and the energy storage device to achieve the commanded acceleration based on the determined combination, wherein the cost associated with use of the energy storage device to assist with achieving the commanded acceleration is based on a first level of energy stored in the energy storage device and an estimated amount of time required to restore energy to the energy storage device to the first eel of stored energy if the energy of the energy storage device is used to assist with achieving the commanded acceleration.

7. The hybrid vehicle of claim 6, wherein the at least one propulsion member comprises one of a wheel, a propeller, and a tan.

8. The hybrid vehicle of claim 6, wherein the transmission comprises a continuously-variable transmission.

9. The hybrid vehicle of claim 6, wherein the transmission comprises an electric motor.

10. The hybrid vehicle of claim 6, wherein the hybrid vehicle comprises one of a car, a truck, a train, a boat, and an airplane.

11. The hybrid vehicle of claim 6, wherein the cost associated with using the power source to assist with achieving the commanded acceleration comprises a cost associated with fuel consumption resulting from operation of the power source to achieve the commanded acceleration and a cost associated with undesirable emissions resulting from operation of the power source to achieve the commanded acceleration.

12. The hybrid vehicle of claim 6, wherein the cost associated with using the generator to assist with achieving the commanded acceleration comprises a cost associated with fuel consumption resulting from operation of the power source to operate the generator to achieve the commanded acceleration and a cost associated with undesirable emissions resulting from operation of the power source to operate the generator to achieve the commanded acceleration.

13. The hybrid vehicle of claim 6, wherein the power source comprises at least one internal combustion engine.

14. The hybrid vehicle of claim 6, wherein the energy storage device comprises at least one of a battery, a capacitor, and a flywheel.

15. A computer-implemented method for controlling the power of a hybrid vehicle comprising a power source, a generator, and an energy storage device, the method comprising:

receiving by a processor a signal indicative et a commanded acceleration for the hybrid vehicle;

determining by the processor a potential for each of the power source, the generator and the energy storage device to supply energy to achieve the commanded acceleration;

determining by the processor a cost associated with using each of the power source, the generator, and the energy storage device to achieve the commanded acceleration;

determining by the processor a combination of the power source the generator, and the energy storage device that achieves the commanded acceleration at a lowest total cost; and providing by the processor a signal to at least one of the power source, the generator, and the energy storage device to achieve the commanded acceleration based on the determined combination, wherein the cost associated with use of the enemy storage device to assist with achieving the commanded acceleration is based on a first level of enemy stored in the energy storage device and an estimated amount of time required to restore energy to the energy storage device to the first level of stored enemy if the energy of the energy storage device is used to assist with achieving the commanded acceleration.

16. The method of claim 15, wherein the cost associated with using the power source to assist with achieving the commanded acceleration comprises a cost associated with fuel consumption resulting from operation of the power source to achieve the commanded acceleration and a cost associated with undesirable emissions resulting from operation of the power source to achieve the commanded acceleration.

17. The method of claim 15, wherein the cost associated with using the generator to assist with achieving the commanded acceleration comprises a cost associated with fuel consumption resulting from operation of the power source to operate the generator to achieve the commanded acceleration and a cost associated with undesirable emissions resulting from operation of the power source to operate the generator to achieve the commanded acceleration.

* * * * *